United States Patent
Ni

(10) Patent No.: US 10,209,111 B2
(45) Date of Patent: Feb. 19, 2019

(54) DEVICE AND METHOD FOR DETECTING BLOCKAGES IN AN AGRICULTURAL SPRAYER

(71) Applicant: CNH Industrial America LLC, New Holland, PA (US)

(72) Inventor: Bingcheng Ni, Naperville, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/692,740

(22) Filed: Aug. 31, 2017

(65) Prior Publication Data

US 2017/0363454 A1 Dec. 21, 2017

Related U.S. Application Data

(62) Division of application No. 14/322,248, filed on Jul. 2, 2014, now Pat. No. 9,766,105.

(51) Int. Cl.
| | |
|---|---|
| *A01M 7/00* | (2006.01) |
| *B05B 15/02* | (2006.01) |
| *G01F 1/68* | (2006.01) |
| *B05B 12/00* | (2018.01) |
| *B05B 15/50* | (2018.01) |
| *B05B 1/20* | (2006.01) |
| *B05B 12/08* | (2006.01) |

(Continued)

(52) U.S. Cl.
CPC ............. *G01F 1/68* (2013.01); *A01M 7/0042* (2013.01); *A01M 7/0089* (2013.01); *B05B 1/20* (2013.01); *B05B 12/008* (2013.01); *B05B 12/085* (2013.01); *B05B 15/50* (2018.02); *A01G 25/09* (2013.01); *B05B 15/658* (2018.02)

(58) Field of Classification Search
CPC ...... A01M 7/00; A01M 7/0089; A01M 7/005; A01M 7/0071; B05B 15/02; B05B 15/069; B05B 15/50; B05B 12/085; B05B 12/006; B05B 12/008; G08B 25/10
USPC ........... 239/1, 146, 722, 71, 74; 340/539.26, 340/603, 606–608; 370/535, 916
See application file for complete search history.

(56) References Cited

U.S. PATENT DOCUMENTS 4,392,611 A * 7/1983 Bachman ............ A01M 7/0089
                                                      222/613
4,430,886 A * 2/1984 Rood ...................... B05B 15/50
                                                      73/37

(Continued)

*Primary Examiner* — Jason Boeckmann
*Assistant Examiner* — Joseph A Greenlund
(74) *Attorney, Agent, or Firm* — Rebecca L. Henkel; Rickard K. DeMille

(57) ABSTRACT

An agricultural sprayer arrangement includes a chassis; a ground engaging traction member carried by the chassis; a liquid tank carried by the chassis; a boom carried by the chassis; a conduit associated with the boom in fluid communication with the liquid tank that acts as a fluid flow path; a nozzle having an inlet in fluid communication with the conduit; a first flow sensor placed upstream of the inlet in the fluid flow path that provides a first flow signal; a second flow sensor placed downstream of the inlet in the fluid flow path that provides a second flow signal; and an electrical processing circuit coupled to the first flow sensor and the second flow sensor that is configured to compare the first and second flow signals to determine a flow rate decrease and issue an alarm if the flow rate decrease is less than a predetermined threshold level.

6 Claims, 4 Drawing Sheets

(51) Int. Cl.
*A01G 25/09* (2006.01)
*B05B 15/658* (2018.01)

(56) References Cited

U.S. PATENT DOCUMENTS

| | | | | |
|---|---|---|---|---|
| 4,556,815 A * | 12/1985 | Ohhashi | ............... | B05B 12/085 310/338 |
| 4,905,897 A * | 3/1990 | Rogers | ............... | A01M 7/0096 239/1 |
| 4,917,296 A * | 4/1990 | Konieczynski | ....... | B05B 9/0406 239/1 |
| 5,097,633 A * | 3/1992 | Branton | ............... | B24C 7/0053 451/101 |
| 5,260,875 A * | 11/1993 | Tofte | .................... | A01B 79/005 111/903 |
| 5,294,916 A * | 3/1994 | Bolton | ............... | B01D 1/0082 137/392 |
| 5,891,734 A * | 4/1999 | Gill | ...................... | B01F 5/0453 422/63 |
| 5,927,603 A * | 7/1999 | McNabb | ............. | A01G 25/092 239/63 |
| 6,206,299 B1 * | 3/2001 | Mann | ..................... | B60B 39/02 222/54 |
| 7,054,337 B2 * | 5/2006 | Jackson, III | ......... | H04L 1/1883 370/535 |
| 7,191,798 B2 * | 3/2007 | Edelman | ........... | A61M 39/1011 137/595 |
| 7,311,004 B2 * | 12/2007 | Giles | .................... | A01C 23/047 73/592 |
| 7,502,665 B2 * | 3/2009 | Giles | .................... | A01B 79/005 700/241 |
| 7,969,318 B2 * | 6/2011 | White | .................... | G01M 3/26 340/606 |
| 8,191,795 B2 * | 6/2012 | Grimm | ............... | A01M 7/0089 239/1 |
| 8,359,820 B2 * | 1/2013 | Dohrmann | ............ | A01D 43/14 239/329 |
| 8,360,343 B2 * | 1/2013 | Gudat | ..................... | E01H 3/02 239/172 |
| 8,833,680 B2 * | 9/2014 | Ellingson | ............. | A01C 23/007 239/159 |
| 9,259,745 B2 * | 2/2016 | Kocer | ..................... | B05B 1/30 |
| 9,273,986 B2 * | 3/2016 | Lange | ..................... | G01F 1/68 |
| 9,607,188 B2 * | 3/2017 | Rokhsaz | ................. | H01Q 5/335 |
| 9,766,105 B2 * | 9/2017 | Ni | ......................... | B05B 12/008 |
| 2003/0019152 A1 * | 1/2003 | Raun | .................... | A01C 21/007 47/58.1 SC |
| 2005/0067049 A1 * | 3/2005 | Fima | ..................... | F24H 9/2007 141/192 |
| 2006/0273189 A1 * | 12/2006 | Grimm | ................. | B05B 9/0423 239/146 |
| 2007/0205384 A1 * | 9/2007 | Kurosawa | ............. | F15B 13/081 251/127 |
| 2009/0242657 A1 * | 10/2009 | Peterson | ............. | A01M 7/0089 239/11 |
| 2010/0201516 A1 * | 8/2010 | Gelvin | ................... | H04L 67/12 340/539.26 |
| 2011/0032953 A1 * | 2/2011 | Lee | ...................... | H04B 7/2643 370/535 |
| 2011/0042476 A1 * | 2/2011 | McAlister | ............ | F02M 57/005 239/5 |
| 2012/0211572 A1 * | 8/2012 | Peterson | ............... | A01M 7/006 239/1 |
| 2013/0008361 A1 * | 1/2013 | Trevino | ............... | A01B 79/005 111/120 |
| 2013/0008745 A1 * | 1/2013 | Barrett | ..................... | F02C 7/06 184/6.11 |
| 2013/0037625 A1 * | 2/2013 | Arenson | .............. | A01M 7/0089 239/71 |
| 2013/0144827 A1 * | 6/2013 | Trevino | ................... | G06N 5/02 706/46 |
| 2014/0084078 A1 * | 3/2014 | Nelson | ................... | B05B 15/70 239/69 |
| 2014/0263708 A1 * | 9/2014 | Thompson | ........... | A01C 23/007 239/11 |
| 2014/0277780 A1 * | 9/2014 | Jensen | .................. | B05B 12/004 700/283 |
| 2015/0351375 A1 * | 12/2015 | Ni | ......................... | A01M 7/005 239/1 |
| 2016/0178422 A1 * | 6/2016 | Humpal | .............. | A01M 7/0042 239/71 |

\* cited by examiner

DEVICE AND METHOD FOR DETECTING BLOCKAGES IN AN AGRICULTURAL SPRAYER

CROSS REFERENCE TO RELATED APPLICATIONS

This divisional patent application is based on and takes priority from U.S. patent application Ser. No. 14/322,248 filed Jul. 2, 2014, entitled, "DEVICE AND METHOD FOR DETECTING BLOCKAGES IN AN AGRICULTURAL SPRAYER," which is hereby incorporated by reference herein in its entirety.

BACKGROUND OF THE INVENTION

1. Field of the Invention

The present invention relates to agricultural sprayers, and, more particularly, to detecting a nozzle blockage in an agricultural sprayer.

2. Description of the Related Art

Agricultural sprayers apply a liquid to a crop or the ground at a specified application rate. The liquid may be in the form of a solution or mixture, with a carrier liquid (such as water) being mixed with one or more active ingredients (such as an herbicide, fertilizer, fungicide and/or a pesticide). The application rate can vary over different parts of a field through the use of precision farming techniques, such as by using GPS data to activate/deactivate boom sections of the sprayer as the sprayer traverses over the field.

Agricultural sprayers may be pulled as an implement or self-propelled, and typically include a tank, a pump, a boom assembly, and a plurality of nozzles carried by the boom assembly at spaced locations. The boom assembly typically includes a pair of wing booms, with each wing boom extending to either side of the sprayer when in an unfolded state. Each wing boom may include multiple boom sections, each with a number of spray nozzles (also sometimes referred to as spray tips). Of course, a self-propelled sprayer also includes an onboard power plant (e.g., diesel engine) providing motive force and other power such as hydraulic power, electrical power, etc.

The spray nozzles on the boom disperse one or more liquids from a tank carried by the sprayer on to a field. Each spray nozzle typically connects to a fluid conduit that is carried by the boom and receives a fluid flow from the tank, typically supplied to the fluid conduit by a pump. The nozzles have an inlet that connects to the fluid conduit and allows the fluid flow through the conduit to flow into the nozzle, which distributes the fluid to the field in a droplet or spray mist form.

During a spray operation, one or more of the nozzles can become clogged due to various reasons such as impurities in the carrier or active ingredient(s) accumulating in the nozzle. The nozzles are typically optimized to reduce application overlap during the spray operation, so even a single clogged nozzle can cause the active ingredient to be improperly applied to the field and leave strips unsprayed which may require a make-up run that generates no revenue but requires additional fuel and labor costs. A make-up run also causes additional ground compaction due to more passes and timing delays in killing the target pest or other operations dependent upon the spray application.

One known way to determine whether a blockage exists within a nozzle is to place a flow rate sensor within the nozzle. The sensor outputs a signal that corresponds to the fluid flow rate within the nozzle, which is compared to a preset value to determine whether a blockage exists in the nozzle. Such arrangements place a relatively large sensor within the fluid flow path in the nozzle, which is usually small, that can disrupt the fluid flow through the nozzle. Depending on the configuration of the nozzles, it can also be difficult to replace the sensors within the nozzle if the sensor fails.

What is needed in the art is a less invasive way to detect nozzle blockages in an agricultural sprayer.

SUMMARY OF THE INVENTION

The present invention provides an agricultural sprayer arrangement that compares a reference flow rate before a nozzle to a flow rate past the nozzle to determine whether a blockage exists in the nozzle.

The invention in one form is directed to an agricultural sprayer arrangement that includes a chassis, at least one ground engaging traction member carried by the chassis, a liquid tank carried by the chassis, a boom carried by the chassis, a fluid conduit associated with the boom that is in fluid communication with the liquid tank and configured as a fluid flow path, a nozzle that has an inlet in fluid communication with the fluid conduit, a first flow sensor placed upstream of the inlet in the fluid flow path that provides a first flow signal, a second flow sensor placed downstream of the inlet in the fluid flow path that provides a second flow signal, and an electrical processing circuit coupled to the first flow sensor and second flow sensor. The electrical processing circuit is configured to compare the first flow signal to the second flow signal to determine a flow rate decrease and to issue an alarm if the flow rate decrease is less than a predetermined threshold level.

The invention in another form is directed to a method for detecting a blockage in an agricultural sprayer that includes the steps of providing a sprayer that includes a chassis, at least one ground engaging traction member carried by the chassis, a liquid tank carried by the chassis, a boom carried by the chassis, a fluid conduit associated with the boom, a pump configured to produce a liquid flow through at least a portion of the fluid conduit from the liquid tank, a nozzle that has an inlet fluidly connected to the liquid flow in the fluid conduit, a first flow sensor in the liquid flow upstream of the inlet, and a second flow sensor in the liquid flow downstream of the inlet. A first flow rate is determined at the first flow sensor and a second flow rate is determined at the second flow sensor. The first flow rate is compared to the second flow rate to determine a flow rate decrease. A blockage in the nozzle is reported when the flow rate decrease is less than a determined threshold level.

An advantage of the present invention is that the flow rate sensors are not placed within the nozzle and have less of an impact on the fluid flow rate through the nozzle.

Another advantage is that the flow rate sensors are in a location where they can be easily replaced.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION OF THE INVENTION

Figure 1:
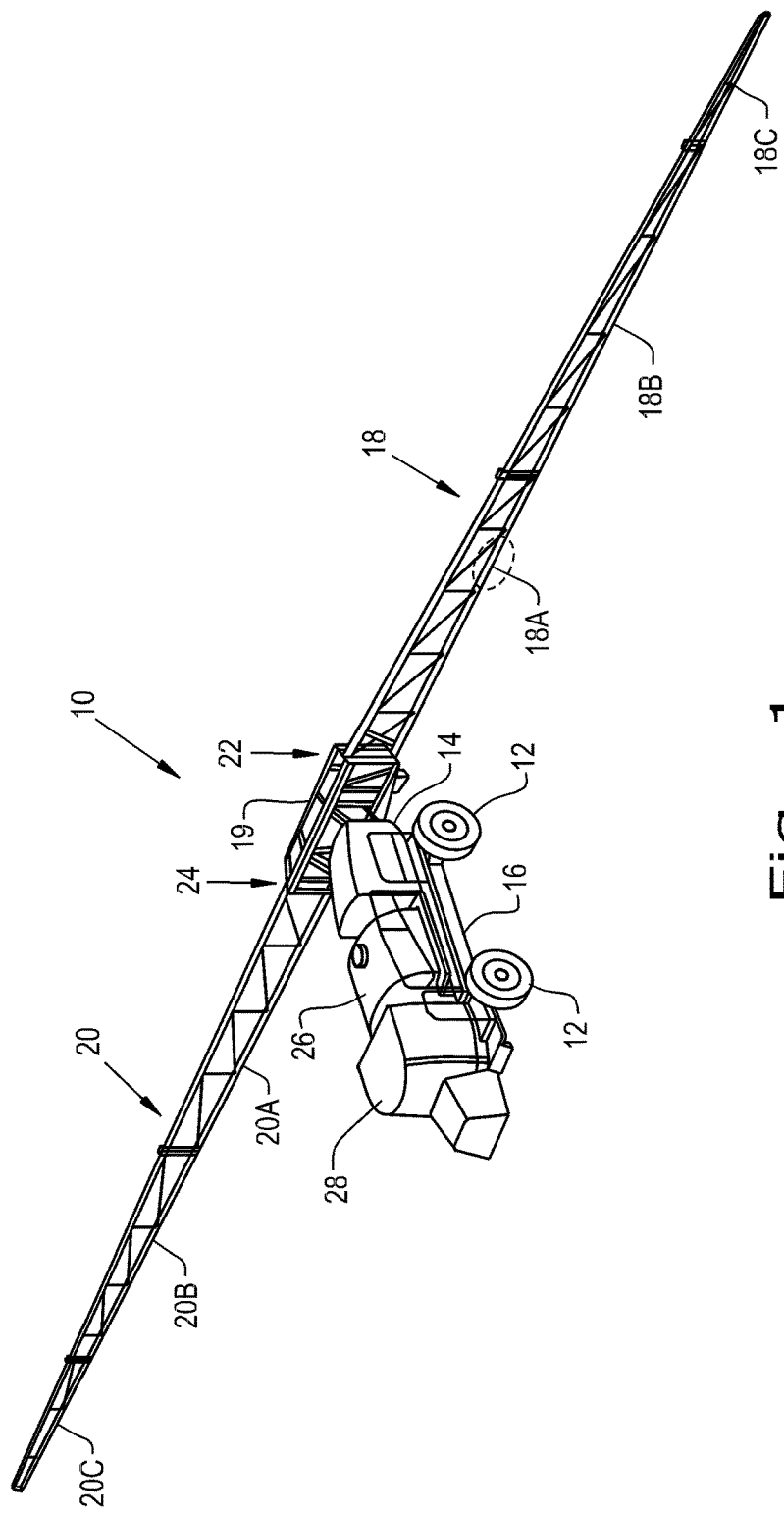
FIG. 1 is a perspective view of an agricultural sprayer of the present invention.

Referring now to the drawings, and more particularly to FIG. 1, there is shown an agricultural sprayer 10 according to one embodiment of the present invention. Agricultural sprayer 10 is shown as a self-propelled sprayer with a plurality of wheels 12 and a prime mover in the form of an internal combustion (IC) engine (e.g., diesel engine) within an engine compartment 14. However, agricultural sprayer 10 could also be configured as a towed sprayer which is towed behind a work vehicle such as a tractor. Moreover, agricultural sprayer could also be a track-type self-propelled vehicle for certain applications.

Agricultural sprayer 10 includes a chassis 16 to which a pair of wing booms 18, 20 are connected, united by a center boom 19. For sake of description, wing boom 18 is considered a left wing boom and wing boom 20 is considered a right wing boom. The wing booms 18, 20 are connected to center boom 19, joined about respective pivot connections 22, 24. Center boom 19 is connected at or near the rear of chassis 16. The wing booms 18, 20 are designed to fold forward toward the leading end of chassis 16 when wing booms 18, 20 are moved from an extended position, shown in FIG. 1, to a stowed or transport position (not shown).

Each wing boom 18, 20 supports a number of boom sections 18A, 18B, 18C, 20A, 20B and 20C. Center boom 19 and wing boom sections 18A, 18B, 18C, 20A, 20B and 20C each include a number of spray nozzles (not shown). In the embodiment shown, each wing boom has three boom sections, corresponding to the fold locations of the wing boom. In the illustrated embodiment, the spray nozzles of center boom 19 and wing boom sections 18A, 18B, 18C, 20A, 20B and 20C are fluidly connected in parallel relative to each other. Moreover, the spray nozzles within center boom 19 and a same wing boom section 18A, 18B, 18C, 20A, 20B or 20C are typically connected together in series. This arrangement of spray nozzles allows the spray nozzles of center boom 19 and wing boom sections 18A, 18B, 18C, 20A, 20B and 20C to be independently turned on and off as sprayer 10 advances across a field (e.g., manually or using GPS data). A liquid tank 26 is carried by the chassis 16 and supplies carrier fluid mixed with active ingredient(s) to the spray nozzles for dispersion on a field. Although the liquid tank 26 is shown as a single tank, the present invention contemplates multiple liquid tanks supplying a solution of carrier fluid mixed with active ingredient(s) to the spray nozzles.

Figure 2:
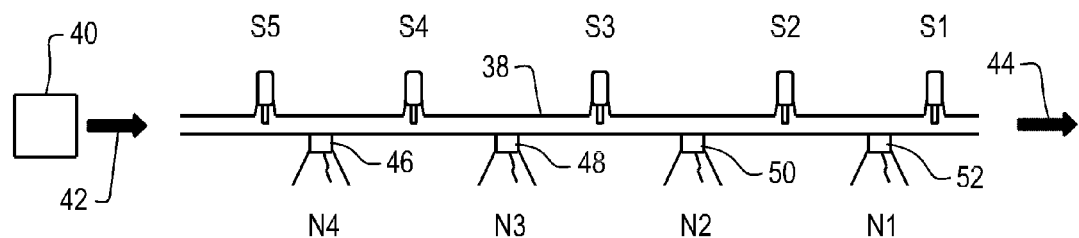
FIG. 2 is a sectional view of a portion of a wing boom section shown in FIG. 1.

Referring now to FIG. 2, a sectional view of a portion of wing boom section 18A is shown. Although a section of wing boom section 18A is shown, the present invention contemplates that any of the other wing boom sections 18B, 18C, 20A, 20B and 20C can be structured in a similar manner. As can be seen, a fluid conduit 38 is associated with wing boom section 18A and is supplied with fluid from liquid tank 26 by a pump 40 that is connected to the liquid tank 26 and the fluid conduit 38. In the illustrated embodiment, fluid conduit 38 is assumed to be a reinforced hose which is carried by wing boom section 18A and is supplied with fluid from liquid tank 26 by a pump 40 that is connected to the liquid tank 26 and the fluid conduit 38. Arrows 42 and 44 represent the fluid flow direction through fluid conduit 38, with "downstream" referring to the direction that arrows 42 and 44 point (to the right of the page) and "upstream" referring to the direction opposite downstream (to the left of the page). Reference to "downstream" and "upstream" are used only for convenience in describing the relative locations of various elements of the present invention and are not intended to limit the scope of the invention. A series of spray nozzles N4, N3, N2, N1 are fluidly connected to the fluid conduit 38 and are configured to disperse fluid from the liquid tank 26 to a field that the agricultural sprayer 10 is travelling across. Each spray nozzle N4, N3, N2, N1 has a respective inlet 46, 48, 50, 52 where fluid from the fluid conduit 38 enters the spray nozzle N4, N3, N2, N1. Typically, the inlets 46, 48, 50, 52 have a diameter that is significantly smaller than the diameter of the fluid conduit 38.

Flow rate sensors S5, S4, S3, S2, S1 are placed in the fluid conduit 38 to measure a local fluid flow rate at each sensor's location. Each flow rate sensor S5, S4, S3, S2, S1 provides an output signal that can be processed by an electrical processing circuit (described later) to determine the local fluid flow rate. Flow rate sensors S5, S4, S3, S2, S1 are shown as being thermal dispersion flow rate sensors, which don't have moving parts, but any flow rate sensor is contemplated for use in the present invention. Similarly, the flow rate sensors S5, S4, S3, S2, S1 shown will provide an output signal with varying frequency to indicate different local fluid flow rates, but flow rate sensors that output signals with varying voltages could also be used. As can be seen, each spray nozzle N4, N3, N2, N1 has a pair of associated flow rate sensors, with one of the flow rate sensors being upstream of the nozzle's inlet and the other flow rate sensor being downstream of the nozzle's inlet. For example, spray nozzle N4 has associated flow rate sensor S5 upstream of the inlet 46 and associated flow rate sensor S4 downstream of the inlet 46. Similarly, spray nozzle N3 has associated flow rate sensor S4 upstream of the inlet 48 and associated flow rate sensor S3 downstream of the inlet 48. It can therefore be seen that each spray nozzle does not need a separate pair of associated flow rate sensors, but one or more flow rate sensors can be associated with one or two nozzles.

Figure 3:
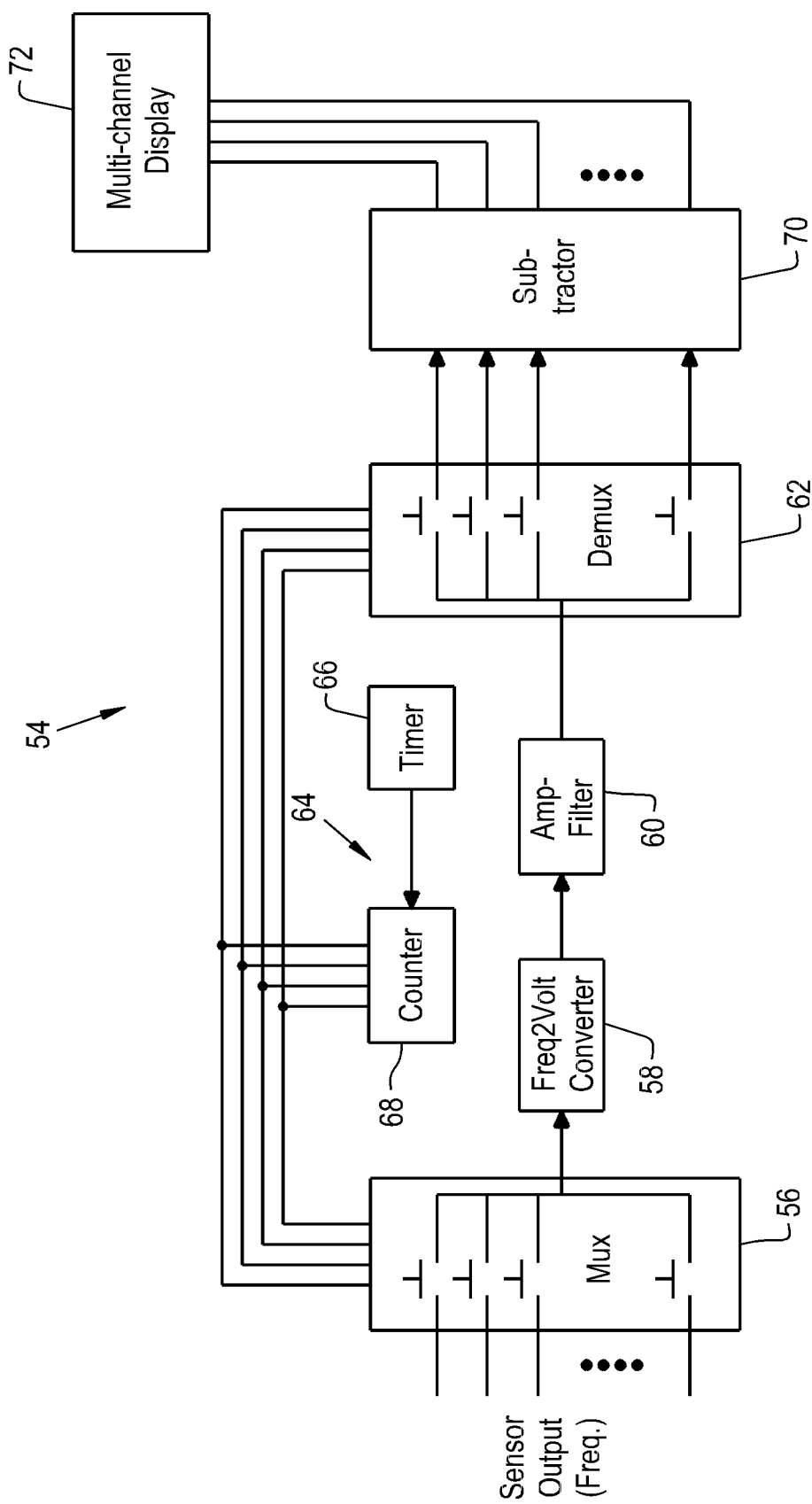
FIG. 3 is a schematic view of an electrical processing circuit of the present invention.

Referring now to FIG. 3, a diagram of an electrical processing circuit (EPC) 54 of the present invention is shown. The EPC 54 is configured to determine whether a blockage exists in the nozzles, based on output signals from the flow rate sensors S5, S4, S3, S2, S1, and can be configured as any type of suitable processor, such as a digital controller, an analog processor, hardwired components or an application specific integrated circuit (ASIC). The EPC 54 can include a multiplexer 56 that is coupled to the flow rate sensors S5, S4, S3, S2, S1 and a frequency converter 58 that converts the varying frequency output signals from the sensors S5, S4, S3, S2, S1 to varying voltage signals. If flow rate sensors that provide varying voltage output signals are used, the frequency converter 58 is not necessary. The varying voltage output signals are received by an amplifying filter 60, which will increase the voltage of the output signals and remove signal noise. It is useful if the amplifying filter 60 adds a high gain to the varying voltage output signals, for reasons that will be described below. The amplified output signal is then received by a de-multiplexer 62. When a multiplexer 56 and de-multiplexer 62 are used to send output signals from each individual flow rate sensor S5, S4, S3, S2, S1 across a single path, a timing circuit 64 is included to generate a clock signal that controls the multiplexer 56 and de-multiplexer 62. This allows each flow rate sensor's output signal to be sorted out by the EPC 54. The timing circuit 64 includes a timer 66 and a counter 68 to control the multiplexer 56 and de-multiplexer 62.

A subtractor 70 is coupled to the de-multiplexer 62 and receives the amplified output signals. Once two amplified output signals are received, the subtractor 70 can output a differential signal, which has a voltage equal to the difference between the two received signals, to a multi-channel display 72 that is coupled to the subtractor 70. For example, flow rate sensor S5 can output a signal that gets converted and amplified to have a voltage V1 and flow rate sensor S4 can output a signal that gets converted and amplified to have a voltage V2. The signals are transmitted through multiplexer 56 and the de-multiplexer 62 to the subtractor 70, which can subtract voltage V2 from voltage V1 to produce a differential signal that corresponds to the nozzle N4. The differential signal is then output to the multi-channel display 72, which can be placed in view of a user and configured to report an alarm if one or more spray nozzles is clogged, based on the differential signal received from the subtractor 70. One multi-channel display 72 that could be used is commercially sold as the AFS Pro 700 by Case IH Corporation. It is contemplated that the multi-channel display 72 can also be interactive so that a user could, for example, reset an issued alarm through the multi-channel display 72 if a false positive clogged condition is reported. While a differential signal from sensors S5 and S4 is described that corresponds to nozzle N4, all the nozzles N4, N3, N2, N1 shown can have corresponding differential signals produced from the nozzle's associated sensors. As shown in FIG. 2, nozzle N4's associated sensors are sensors S5 and S4; nozzle N3's associated sensors are sensors S4 and S3; nozzle N2's associated sensors are sensors S3 and S2; and nozzle N1's associated sensors are sensors S2 and S1. While four nozzles N4, N3, N2, N1 and five sensors S5, S4, S3, S2, S1 are shown, it is contemplated that fewer or more nozzles and sensors could be utilized by the present invention. It is only required that each nozzle have a pair of associated sensors.

Figure 4:
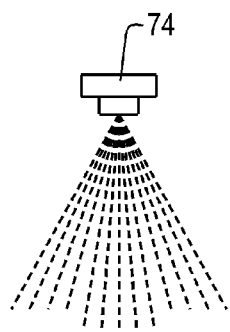
FIG. 4 is a perspective view of an unclogged nozzle in operation.
Figure 5:
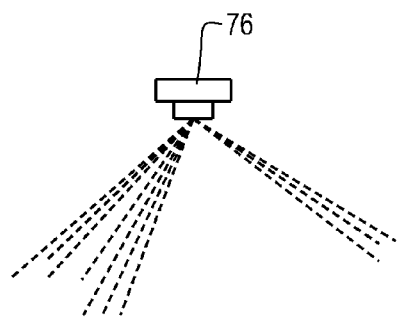
FIG. 5 is a perspective view of a partially clogged nozzle in operation.

Referring now to FIGS. 4 and 5, an unclogged spray nozzle 74 is shown operating in FIG. 4 and a partially clogged spray nozzle 76 is shown operating in FIG. 5. As can be seen, the partially clogged spray nozzle 76 is still dispersing fluid, but at a lower rate than the unclogged spray nozzle 74. Under the principle of continuity, the flow rate of liquid in the fluid conduit 38 will drop across each nozzle N4, N3, N2, N1 by an amount that is equal to the flow rate of liquid out the respective nozzle N4, N3, N2, N1. Using this relationship, it can be determined whether a nozzle is blocked or not based on the difference in flow rates at a location directly upstream of the nozzle and directly downstream of the nozzle. A greater dispersed liquid flow rate will lead to a greater flow rate drop across the nozzle, leading to a greater differential signal being output by the subtractor 70. If using a frequency converter 58, this means that a differential signal with a higher voltage corresponds to a greater flow rate through a particular nozzle. The associated sensors for each nozzle can be configured to output a signal that is directly affected by changes in flow rate decreases, allowing for the percentage of unobstructed flow rate through each nozzle to be determined based on a known unobstructed flow rate and the obtained differential signal from the associated sensors.

The multi-channel display 72 can be configured so that an alarm is issued upon receiving a differential signal below a predetermined threshold value that indicates a flow rate decrease below a predetermined threshold level. As the predetermined threshold value directly correlates to a predetermined threshold level of flow through the nozzle, the terms can be used interchangeably when referring to flow rate measurement in the present invention. The predetermined threshold value can be set as any value that indicates a nozzle is not clogged, which can be easily determined by sampling flow rate decrease values of known unclogged nozzles to determine values that correlate to unobstructed flow rates. One simple example of a predetermined threshold value is the voltage required to keep an LED light (not shown) included in the multi-channel display 72 turned on. When the differential signal drops below a certain voltage, indicating a low difference in flow between two associated sensors and potential clog in the nozzle, the LED light can turn off. A turned off LED light could then act as an alarm to an operator that there is a nozzle that may not be properly functioning. Each nozzle's associated pair of sensors can be coupled to a single LED in the multi-channel display 72 using the multiplexer 56, de-multiplexer 62 and subtractor 70, allowing for a large number of nozzles to be monitored simultaneously. Other more elaborate ways of determining whether the differential signal indicates a clogged nozzle and reporting a blockage could be used, such as signal processing being performed within the multi-channel display 72 that creates an audible or visual alarm on the multi-channel display 72 when the received differential signal indicates a clogged nozzle. Since the difference between two flow sensors might be low, even when the nozzle is unclogged, high gains added by the amplifying filter 60 can allow for greater precision in determining whether a nozzle is clogged or not by increasing the effect on the differential signal. Larger differential signals allow for a greater range of predetermined threshold values to be chosen that indicate an unclogged vs. partially or fully clogged nozzle.

Figure 6:
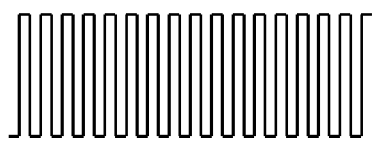
FIG. 6 is a waveform diagram of an output signal that indicates an unclogged nozzle.
Figure 7:
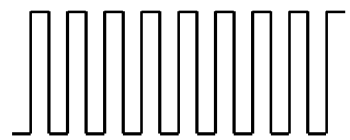
FIG. 7 is a waveform diagram of an output signal that indicates a partially clogged nozzle.

While the EPC 54 is shown in FIG. 3 as utilizing a frequency converter and subtractor, it is also contemplated that associated sensors could be coupled together to produce a single output signal with varying frequency, which could then be the differential signal. FIG. 6 shows an example differential signal produced by associated sensors of unclogged nozzle 74 that are coupled together and FIG. 7 shows an example differential signal produced by associated sensors of partially clogged nozzle 76 that are coupled together. As can be seen, the frequency of the signal output by the associated sensors in FIG. 6 has a relatively high frequency, indicating an unclogged nozzle, compared to the frequency of the signal output by the associated sensors in FIG. 7, which indicates a partially clogged nozzle. The predetermined threshold value could therefore be a certain signal frequency that is processed by the multi-channel display 72, with frequency values below the predetermined threshold value indicating a clogged nozzle.

Figure 8:
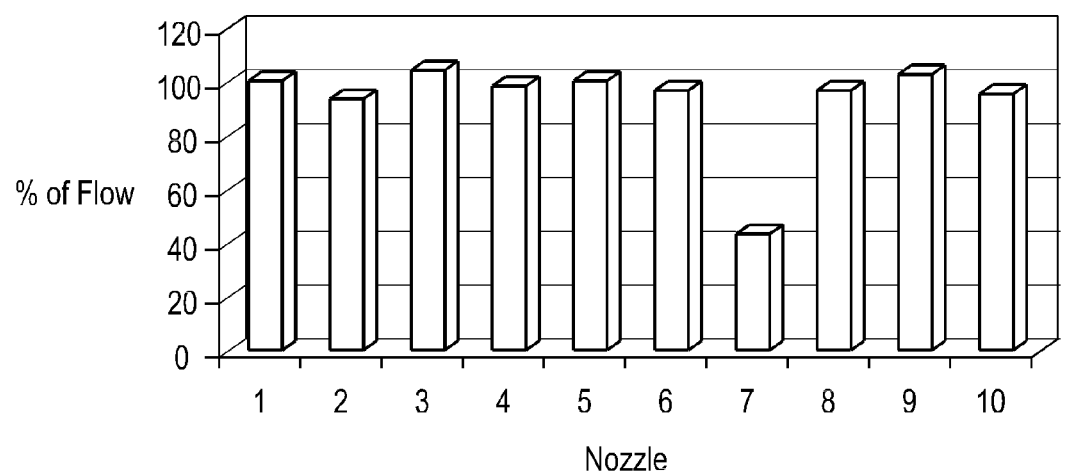
FIG. 8 is a bar graph illustrating flow rate percentage deviations in an agricultural sprayer for unclogged and partially clogged sprayer nozzles Corresponding reference characters indicate corresponding parts throughout the several views. The exemplifications set out herein illustrate embodiments of the invention and such exemplifications are not to be construed as limiting the scope of the invention in any manner.

It is normal for the flow rate between identically structured nozzles to deviate from each other, as shown in FIG. 8. The flow rate through the unclogged nozzles 1, 2, 3, 4, 5, 6, 8, 9 and 10 are shown as varying between approximately 90% and a little over 100% of maximum flow. The unclogged nozzles 1-6, and 8-10 have a relatively tight distribution of flow rate percentages. Nozzle 7 is shown with a significantly lowered flow rate of just over 40%, which is indicative that the nozzle 7 has been clogged. It is therefore contemplated that the predetermined threshold value chosen before an alarm is issued can take into account normal flow rate deviations that are not indicative of a clogged spray nozzle. The predetermined threshold value can be chosen to issue an alarm when it correlates to a flow rate of 80% or lower of maximum flow, which could be indicative of a spray nozzle clogging. It is also contemplated that the predetermined threshold value can correlate to a flow rate percentage that deviates from the median or average flow rate of all spray nozzles by a certain number of standard deviations calculated by the EPC 54. It is also contemplated that multiple alarms can be issued, such as a warning alarm that alerts a user to a pressure difference signal which correlates to a flow rate percentage of below 90% but above 80% and a clogged alarm that alerts a user to a pressure difference signal which correlates to a flow rate percentage of below 80%. The predetermined threshold values before issuing an alarm are given only by way of example and not to limit the scope of the invention in any manner.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:
1. A method for detecting a blockage in an agricultural sprayer, comprising the steps of:
    providing a sprayer that includes a chassis, at least one ground engaging traction member carried by the chassis, a liquid tank carried by the chassis, a boom carried by the chassis, a fluid conduit associated with the boom in fluid communication with the liquid tank and configured as a flow fluid path, a pump configured to produce a liquid flow through at least a portion of the fluid conduit from the liquid tank, a nozzle having an inlet that is fluidly connected to the liquid flow in the fluid conduit, a first flow sensor in the liquid flow upstream of the inlet, and a second flow sensor in the liquid flow downstream of the inlet, and an electric processing circuit having a multiplexer coupled to the first flow sensor and the second flow sensor, a frequency converter coupled to the multiplexer, an amplifying filter coupled to the frequency converter, a de-multiplexer coupled to the amplifying filter, and a subtractor coupled to the de-multiplexer;
    receiving a first signal from the first flow sensor into the multiplexer, converting the first signal via the frequency converter, amplifying the first signal via the amplifying filter, outputting the amplified first signal to the de-multiplexor, and outputting the first signal from the de-multiplexor to the subtractor;
    receiving a second signal from the second flow sensor into the multiplexer, converting the second signal via the frequency converter, amplifying the second signal via the amplifying filter, outputting the amplified second signal to the de-multiplexor, and outputting the second signal from the de-multiplexor to the subtractor;
    outputting a differential signal based upon the first signal and the second signal from the subtractor, and sending the differential signal to a display; and
    reporting an alarm on the display as a result of the differential signal when the differential signal falls below a predetermined threshold level to indicate a blockage.

2. The method according to claim 1, further including the step of determining a nozzle flow rate based on a flow rate decrease.

3. The method according to claim 2, wherein the predetermined threshold level corresponds to the nozzle flow rate being below a desired level.

4. The method according to claim 3, wherein the desired level is approximately 80% of unobstructed liquid flow through the nozzle.

5. The method according to claim 1, wherein the first flow sensor and the second flow sensor are both thermal dispersion flow sensors.

6. The method according to claim 1, wherein the electrical processing circuit further includes a timing circuit configured to output a clock signal to at least one of the multiplexer and the de-multiplexer.

* * * * *